US006603772B1

(12) United States Patent
Moussavi et al.

(10) Patent No.: US 6,603,772 B1
(45) Date of Patent: *Aug. 5, 2003

(54) MULTICAST ROUTING WITH MULTICAST VIRTUAL OUTPUT QUEUES AND SHORTEST QUEUE FIRST ALLOCATION (75) Inventors: Farshid Moussavi, San Francisco, CA (US); Dhaval N. Shah, Santa Clara, CA (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 87 days.

(21) Appl. No.: 09/282,539

(22) Filed: Mar. 31, 1999

(51) Int. Cl.[7] .................................................. H04J 3/26
(52) U.S. Cl. ........................................ 370/432; 370/413
(58) Field of Search ................................ 370/390, 389, 370/392, 411–418, 432

(56) References Cited

U.S. PATENT DOCUMENTS

| 5,638,359 A | 6/1977 | Peltola et al. |
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |

(List continued on next page.)

FOREIGN PATENT DOCUMENTS

| EP | 0 384 758 A2 | 8/1990 |
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

Allen, M., "Novell IPX Over Various WAN Media (IPXWAN)," Network Working Group, RFC 1551, Dec. 1993, pp. 1–22.
Becker, D., "3c589.c: A 3c589 EtherLink3 ethernet driver for linux," becker@CESDIS.gsfc.nasa.gov, May 3, 1994, pp. 1–13.
Chowdhury, et al., "Alternative Bandwidth Allocation Algorithms for Packet Video in ATM Networks," INFOCOM 1992, pp. 1061–1068.
Doeringer, W., "Routing on Longest–Matching Prefixes," IEEE/ACM Transactions in Networking, vol. 4, No. 1, Feb. 1996, pp. 86–97.

(List continued on next page.)

Primary Examiner—Wellington Chin
Assistant Examiner—Brenda Pham
(74) Attorney, Agent, or Firm—Cesari and McKenna, LLP (57) ABSTRACT

The invention includes a method and apparatus for routing multicast traffic with better performance and reduced Head of Line blocking. This is achieved by means of the use of multiple virtual output queues for each input interface that handles multicast traffic, called "multicast virtual output queues" (MVOQs). Schemes for allocation of queues including random allocation, round robin, and Shortest Queue First (SQF) allocation can further improve performance. In an alternative embodiment, global MVOQs that can be used as queues by multiple input interfaces, can be used instead of MVOQs associated with a specific input interface.

45 Claims, 5 Drawing Sheets

U.S. PATENT DOCUMENTS

| | | |
|---|---|---|
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,772 A | 10/1990 | Daniel et al. |
| 4,970,678 A | 11/1990 | Sladowski et al. |
| 4,979,118 A | 12/1990 | Kheradpir ............... 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,128,945 A | 7/1992 | Enns et al. |
| 5,136,580 A | 8/1992 | Videlock et al. |
| 5,166,930 A | 11/1992 | Braff et al. |
| 5,199,049 A | 3/1993 | Wilson |
| 5,206,886 A | 4/1993 | Bingham |
| 5,208,811 A | 5/1993 | Kashio et al. ............. 370/94.1 |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. ........... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema ................... 270/94.1 |
| 5,442,457 A | 8/1995 | Najafi |
| 5,442,630 A | 8/1995 | Gagliardi et al. |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. ............... 370/94.1 |
| 5,485,455 A | 1/1996 | Dobbins et al. |
| 5,490,140 A | 2/1996 | Abensour et al. .......... 370/60.1 |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweazey |
| 5,509,006 A | 4/1996 | Wilford et al. |
| 5,519,704 A | 5/1996 | Farinacci et al. |
| 5,519,858 A | 5/1996 | Walton et al. .............. 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. ............... 370/60 |
| 5,541,911 A | 7/1996 | Nilakantan et al. ........... 370/13 |
| 5,546,370 A | 8/1996 | Ishikawa ................... 369/77.2 |
| 5,555,244 A | 9/1996 | Gupta et al. |
| 5,561,669 A | 10/1996 | Lenney et al. |
| 5,583,862 A | 12/1996 | Callon |

| | | |
|---|---|---|
| 5,592,470 A | 1/1997 | Rudrapatna et al. |
| 5,598,581 A | 1/1997 | Daines et al. |
| 5,600,798 A | 2/1997 | Cherukuri et al. ..... 395/200.13 |
| 5,604,868 A | 2/1997 | Komine et al. |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe .......................... 370/381 |
| 5,632,021 A | 5/1997 | Jennings et al. |
| 5,634,010 A | 5/1997 | Ciscon et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,680,116 A | 10/1997 | Hashimoto et al. ......... 340/827 |
| 5,687,324 A | 11/1997 | Green et al. |
| 5,724,351 A | 3/1998 | Chao et al. |
| 5,754,547 A | 5/1998 | Nakazawa |
| 5,802,054 A | 9/1998 | Bellenger ................... 370/401 |
| 5,835,710 A | 11/1998 | Nagami et al. .......... 395/200.8 |
| 5,854,903 A | 12/1998 | Morrison et al. |
| 5,856,981 A | 1/1999 | Voelker ...................... 371/20.1 |
| 5,892,924 A | 4/1999 | Lyon et al. ............. 395/200.75 |
| 5,898,686 A | 4/1999 | Virgile |
| 5,903,559 A | 5/1999 | Acharya et al. ............. 370/355 |
| 5,974,501 A | * 10/1999 | Shaver et al. ................ 711/105 |
| 6,049,546 A | * 4/2000 | Ramakrishnan ............. 370/412 |
| 6,115,462 A | * 9/2000 | Servi et al. .................. 379/221 |
| 6,216,167 B1 | * 4/2001 | Momirov .................... 709/238 |
| 6,295,285 B1 | * 9/2001 | Whitehead .................. 370/329 |
| 6,335,939 B1 | * 1/2002 | Hanna et al. ................ 370/501 |
| 2001/0050916 A1 | * 12/2001 | Krishna et al. |

OTHER PUBLICATIONS

Esaki, et al., "Datagram Delivery in an ATM–Internet," 2334b IEICE Transactions on Communications, Mar. 1994, No. 3, Tokyo, Japan.

IBM Corporation, Method and Apparatus for the Statistical Multiplexing of Voice, Data and Image Signals, IBM Technical Disclosure Bulletin, No. 6, Nov. 1992, pp. 409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–to–Point Protocol (PPP)," Network Working Group, RFC 1548, Dec. 1993, pp. 1–53.

Tsuchiya, P.F., "A Search Algorithm for Table Entries with Non–Contiguous Wildcarding," Abstract, Bellcore.

Zhang, et al., "Rate–Controlled Static–Priority Queueing," INFOCOM 1993, pp. 227–236.

* cited by examiner

FIG. 1

SAMPLE FLOW TABLE FOR 4 OUTPUT QUEUES

| DESTINATION VECTOR | OUTPUT QUEUE | NUMBER OF CELLS IN QUEUE |
|---|---|---|
| 1010 | 1 | 1 |
| 0010 | 2 | 1 |
| 0100 | 3 | 3 |
| 0001 | 4 | 2 |
| 0110 | 1 | 1 |

MULTICAST ROUTING WITH MULTICAST VIRTUAL OUTPUT QUEUES AND SHORTEST QUEUE FIRST ALLOCATION

RELATED APPLICATIONS

This invention relates to U.S. Patent Application: application Ser. No 09/283,109, Express Mail Mailing No. EJ667757725US, filed this same day, in the name of Farshid Moussavi and Dhaval N. Shah, titled "Multicast Routing With Nearest Queue First Allocation and Dynamic and Static Vector Quantization," assigned to the same assignee, The application is hereby incorporated by reference as if fully set forth herein.

It is respectfully suggested that it may be appropriate for the same examiner to examine both applications.

BACKGROUND OF THE INVENTION

1. Field of the Invention

This invention relates to multicast routing.

2. Related Art

Communication on a computer network is accomplished by sending messages. Messages can include one or more data packets. Packets can be of fixed or variable lengths. Cells are packets having a fixed length.

Messages have a source and at least one destination address. A computer network includes devices that direct traffic towards the destination address. A switch is one such device.

Switches have multiple input interfaces and multiple output interfaces, which may be connected in a variety of ways. A cross bar switch is designed so that every input interface can be connected to every output interface.

There are two types of network traffic. In the first type a message has only one final destination address. This is known as unicast traffic. One use of unicast traffic is point to point communication between two computers. In the second type of traffic, called multicast, a message is sent to multiple destinations. One use of multicast transmissions is when a computer user wishes to send a message over the Internet to many individuals wishing to receive the message. A switch can have both unicast input interfaces as well as multicast input interfaces; often an interface handles both unicast as well as multicast traffic.

Memory Bandwidth Limitations

There are two main types of schemes for storing messages in the known art, which are input queuing and output queuing. (Combinations are also possible). In input queuing, a packet is queued before it enters the crossbar switch, and waits in line to arrive at the head of the input queue and be sent onward to its destination across the crossbar fabric. In output queuing, packets are forwarded onto the crossbar fabric from the input interface immediately, and queued up as they arrive at their destination output.

Output queuing hits limitations in memory speed faster than does input queuing because output queuing requires a memory at the output which is capable of momentarily receiving traffic from multiple inputs (in the worst case, all inputs), and sending out traffic at the output line rate. This means the memory in an output queued scheme must be faster than the memory in an input queued scheme by a factor equal to the number of interfaces.

In order to improve efficiency and thus the general performance in the case of high performance systems, it is preferable to use input queuing to accomodate the limited memory speeds available. The following description of the Head of Line Blocking problem assumes an input queued system.

Head of Line Blocking Problem

A unicast message, having only one destination, only needs to be routed to one output interface of a switch. Messages may be simply queued in the order received until they can be transmitted through the selected output interface. A problem in the known art occurs when the message at the head of a first queue is to be sent to an output interface that is not available due to a message from another queue using the output interface. The first queue is blocked until the particular output interface is available; no messages from this queue can be sent until the first element in the queue, or "head element", is cleared by being sent across the switch to the output interface. (The queue may be implemented with each element being a single packet or cell, or may be implemented with each element including all the packets or cells that make up a single message). If the output interface is busy for an extended period, several queues may become blocked. This is known as the Head-of-Line blocking ("HOL blocking") problem.

A known technique for approaching the HOL blocking problem for unicast traffic is the use of virtual output queues ("VOQs"). VOQs are virtual (logical) queues maintained in software or hardware; each VOQ is associated with a physical interface. There is a one-to-one correspondence between the VOQs and possible input/output combinations. The number of VOQs needed scales arithmetically as M×N, where M and N are the number of output interfaces and input interfaces, respectively. For a crossbar switch with 16 unicast input interfaces and 16 output interfaces, commonly called a "16×16" switch, 256 VOQs are need. If a particular output interface is tied up, a virtual queue associated with some other output interface can still send messages to that other output interface.

It should be noted that although the term used is "virtual output queue", the method is actually an input queued method, as the queues are maintained for each input interface.

The VOQ method has the drawback that it only applies to unicast routing. VOQs cannot be applied to multicast routing because for multicast the number of VOQs needed to accommodate all possible input/output combinations is prohibitively large, growing exponentially as $2^M \times N$, where M is the number of output interfaces and N is the number of multicast input interfaces. For a switch with 2 input interfaces and 16 output interfaces, a total of $2 \times 2^{16}$ (approximately 130,000) virtual queues would be required to implement VOQs. Very large numbers of VOQs use valuable resources such as memory and chip real estate, and likely cannot fit on a single chip using current technology.

Multicast transmissions are increasingly common and HOL blocking is an ongoing and unaddressed problem for multicast routing. Accordingly, it would be advantageous to be able to route multicast messages with reduced HOL blocking, in a manner such that there is overall improved performance of the network.

This advantage is achieved in an embodiment of the invention in which multiple virtual output queues, for convenience in this application called "multicast virtual output queues" ("MVOQs"), are maintained for a multicast interface, the number of queues being an intermediate number between 1 and $2^M$, such as 8 for a switch having 16 output interfaces (M=16). These MVOQs are an input queued system. Implementation of an allocation policy in conjunction with queues can also increase performance.

SUMMARY OF THE INVENTION

The invention includes a method and apparatus for routing multicast traffic with better performance and reduced Head of Line blocking. This is achieved by means of the use of multiple virtual output queues for each input interface that handles multicast traffic, called "multicast virtual output queues" (MVOQs). Schemes for allocation of queues including random allocation, round robin, and Shortest Queue First (SQF) allocation can further improve performance. In an alternative embodiment, global MVOQs that can be used as queues by multiple input interfaces, can be used instead of MVOQs associated with a specific input interface.

DETAILED DESCRIPTION OF THE PREFERRED EMBODIMENT

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Related Applications

Inventions described herein can be used in combination or conjunction with inventions described in the following patent application:

application Ser. No. 09/283,109, Express Mail Mailing No. EJ667757725US, filed this same day, in the name of Farshid Moussavi and Dhaval N. Shah, titled "Multicast Routing With Nearest Queue First Allocation And Dynamic and Static Vector Quantization," assigned to the same assignee, attorney docket number CIS-062. The application is hereby incorporated by reference as if fully set forth herein.

Cell-based Network with Crossbar Switch and SQF

For clarity, the invention is described as used in a crossbar switch having one multicast input interface and 16 output interfaces, in a network using cell-based messages. It is to be understood that the invention may be applied to sizes other than 16-output interface crossbar and to switches other than cross bar switches. It is further to be understood that the invention may be applied to data transmissions other than cell-based transmission.

It is further to be understood that the invention may be applied to switches having both unicast as well as multicast input interfaces, or having input interfaces that handle both unicast as well as multicast traffic. The invention may be practiced in combination with VOQs, or unicast cells may simply be treated as multicast cells with a single bit set in the destination vector.

The preferred embodiment is described using 8 multicast virtual output queues. Other numbers of MVOQs can be used; however, for the preferred embodiment as described above and below, between 2 and 16 MVOQs provide the best performance advantages. Depending on the situation, such as the number of input and output interfaces, types of traffic, costs associating with implementing queues, other numbers of MVOQs may be preferred.

Cell-based means the data packets sent along the network have a fixed length.

Terminology

A multicast message is directed to multiple destinations. The "multicast destination vector" or "destination vector" stores the output interfaces for a given message. M is the number of output interfaces in the switch and the vector can be implemented as an M-bit bitmask. Each destination address combination can be represented by an M-bit vector; setting a bit to 1 indicates the message is to be sent to the corresponding output interface. For instance, a switch having 4 output interfaces has 16 possible destination address combinations; a destination vector of [0,1,1,0] means that the message should be sent to output interfaces 1 and 2, but not to output interfaces 0 or 3, in a switch where the four output interfaces are numbered 0, 1, 2, and 3.

A broadcast message is a case of multicast message. The broadcast message may have a special destination address, or an address where all bits in the destination vector are set. A broadcast message is treated as though all bits in the destination vector are set.

A "multicast flow" is a stream of packets, with the same multicast destination vector. A flow is defined as a "new flow" if no packets with that flow's destination vector exist in any of the multicast virtual output queues at the time of its arrival.

Two flows are "non overlapping flows" if their destination vectors do not both have a bit set in any location of their destination bitmask. That is, the flows do not share any common output interface.

Relation of Message to Flows

A message includes one or more data packets, which are preferably cells (fixed-length packets). A message can be one flow. If the transmission of a message is interrupted for a length of time, a message can give rise to multiple multicast flows, as defined above. However, at the time of handling by the switch, a flow that comprises a complete message is handled the same as a flow that is one of several flows comprising a message.

Overview of the Invention

Figure 1:
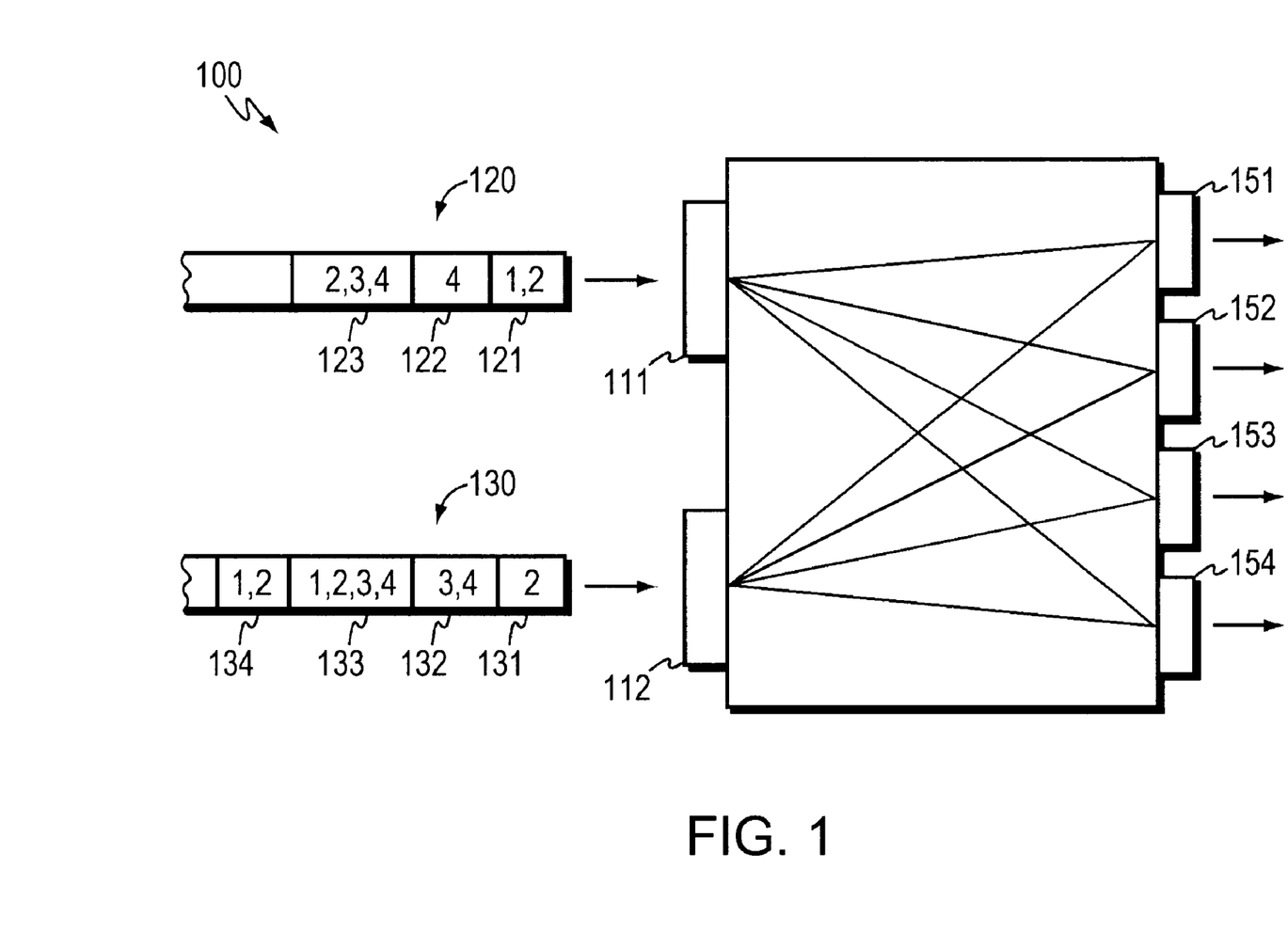
FIG. 1 is a diagram of a crossbar switch with 2 input interfaces and 4 output interfaces, with messages in a queue for each input interface.

Packets, which are cells in the preferred embodiment, arrive at an input interface of a switch. The switch routes network traffic to the appropriate destination(s). FIG. 1 is a diagram 100 of a cross bar switch having two input interfaces 111, 112 and four output interfaces 151–154. Input queues 120, 130 contain messages for respective input interfaces 111, 112. For convenience, in FIG. 1 each message is depicted as a single entry in the queue although each cell in a message is processed and queued separately, as discussed below, and the cells of different messages may arrive at the input interleaved. The messages in input queues 120, 130 are destined for various combinations of output interfaces. Each message may include one or more packets. The destination output interfaces for each message in the input queues 120, 130 are indicated by the sets of numbers shown in the schematic depiction of the entries in the queues 121–123, 131–134.

Each arriving cell is processed separately. If the cell is part of an existing flow, the MVOQ already allocated to the existing flow is selected as the MVOQ for this cell. If the cell is not part of an existing flow, the MVOQ for this cell is selected according to Shortest Queue First in the preferred embodiment.

The cell is queued in the selected MVOQ. Items in the MVOQs are scheduled and sent across the switch by a scheduler as in known in the art of switches. Once the cell has been sent to all destinations that are requested in its destination vector, the cell is dequeued from the MVOQ.

Number of MVOQs

For a switch with 16 outputs, there are preferably eight MVOQs. Greatest relative improvement is seen for approximately 2–16 MVOQs for such a switch. Diminishing returns on better performance occur when going to more than about 16 MVOQs for a 16 output switch.

Allocation of Queues for Existing Flows

The cells in a multicast flow are preferably assigned to the same output queue. If an incoming cell is part of an existing flow, the cell is assigned to the same MVOQ as the other cells in the existing flow. The detailed steps and data structures are discussed in the section on queuing a flow.

Assigning the cells in one multicast flow to different output queues would increase the chance that the head elements of two queues will be the same, resulting in HOL blocking, and is therefore undesirable in most circumstances. In addition, assigning a flow to one queue assures that the cells in the flow retain their ordering; that is, the cells will not arrive at the destination out of order, as might happen if flows were split between different queues.

Allocation of Queues for New Flows

The decision to which of the queues (8 MVOQs in the preferred embodiment) to allocate a flow can improve performance of the network. In the preferred embodiment, assignment of new flows is done by shortest queue first (SQF) allocation. However, allocation can also by done by random assignment, round robin, or other policies. These policies are subsequently described. The detailed steps and data structures are discussed in the section on queuing a flow.

Random Assignment

One allocation policy is allocation of queues by random assignment of flows to queues. This is a simple and computationally fast method. On average, random assignment results in good performance.

Round Robin

Another allocation policy is allocation of queues by round-robin assignment of flows to queues. That is, the output queues are picked in sequential, cyclical order. If there are M output queues, flow 1 is assigned to queue 1 and flow 2 is assigned to queue 2, and so on. Flow M+1 is assigned to queue 1, and flow M+2 is assigned to queue 2, and so on. Performance of the system using the round robin allocation policy will vary depending on the general character of the incoming traffic, and depending on the specific traffic that comes in.

Shortest Queue First

The preferred allocation policy is to allocate queues by assigning flows to the shortest queue first. We call this the "SQF" allocation policy. A queue may become very long because a flow assigned to it was very long, or it may become very long due to head of line blocking. SQF has the advantage of providing automatic feedback to the system, because flows are automatically directed away from long queues: by choosing the shortest queue, queues where there is HOL blocking are on average avoided. The detailed steps for selecting the shortest queue are discussed in the section on queuing a flow.

Other Allocation Policies

Other allocation policies, including combinations of allocation policies also may be used. A combination of random allocation with SQF, for instance by allocating every other flow by SQF, combines the random allocation policy feature of small computation time with the SQF feature of automatic feedback. Another example combination would be a weighted average of SQF allocation and Nearest Queue First ("NQF") allocation which is disclosed in the above referenced, co-pending, application, "Multicast Routing With Nearest Queue First Allocation and Dynamic and Static Vector Quantization." It is to be noted that even without a particular allocation policy, the use of multicast virtual output queues increases throughput of a switch.

Queuing a Cell

Figure 2:
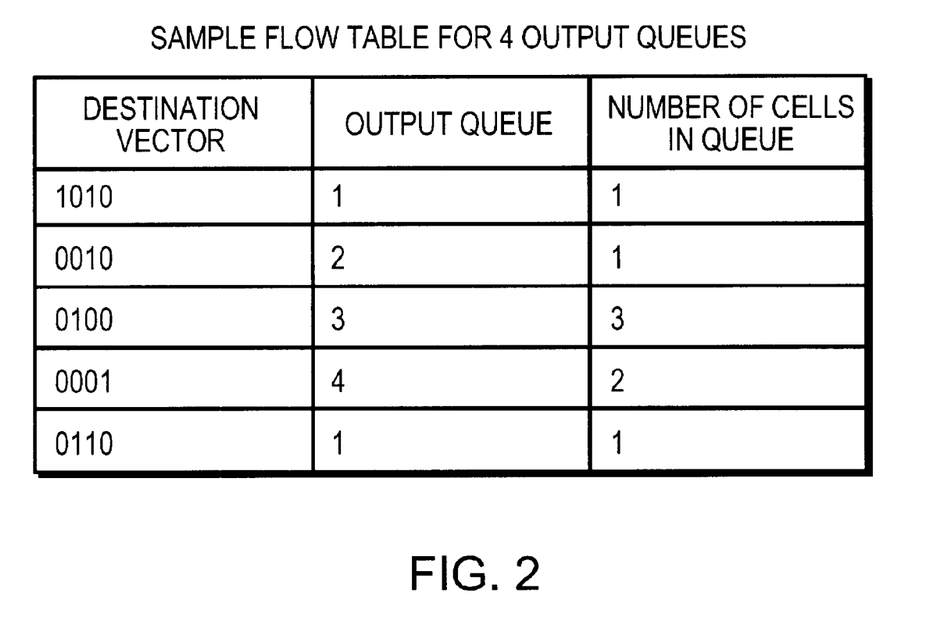
FIG. 2 is a diagram of a flow table.

In the preferred embodiment, for each destination vector for which there is a cell in any queue, an entry showing the output queue to which the destination vector is assigned is kept, and a count of the number of cells having this destination vector is maintained. This information can be kept in a flow table. A diagram of an example flow table is shown in FIG. 2. In the preferred embodiment, the table is implemented in a Content Addressable Memory (CAM).

Figure 3:
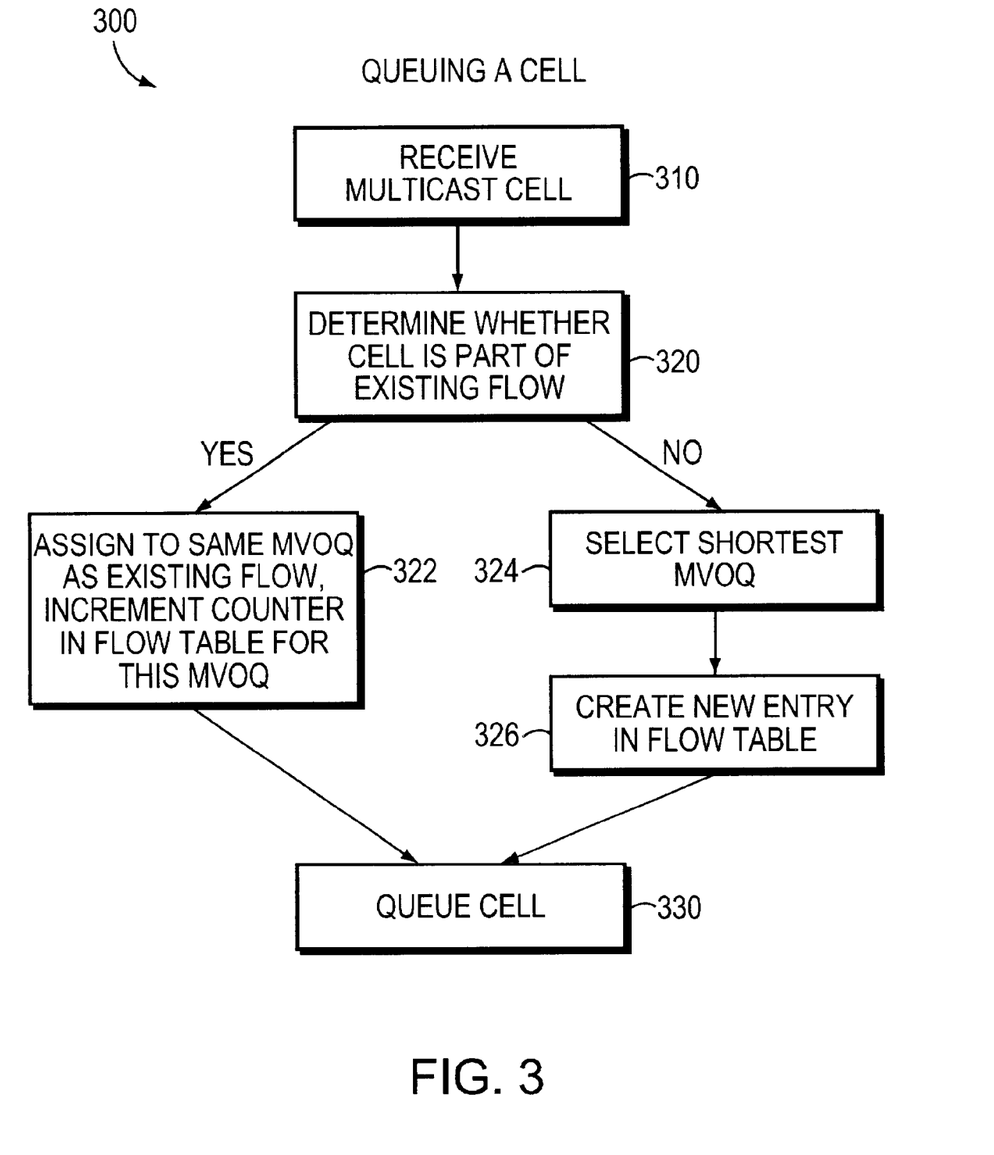
FIG. 3 is a process flow diagram of queuing a cell using MVOQs.

FIG. 3 is a process flow diagram 300 for queuing a cell. Each cell is handled separately. Upon receipt of a cell 310, an MVOQ is selected for the cell. To select an MVOQ, it is determined whether the cell is part of an existing multicast flow 320. This is done by checking the destination vector against the entries in the flow table.

If a matching entry is found, the cell is assigned to the same MVOQ as the entry and the counter in the flow table for that destination vector is incremented 322. Placing a cell in the same queue as earlier encountered cells with the same destination vector ensures that the ordering of cells on arrival at the destinations will be maintained.

Figure 4:
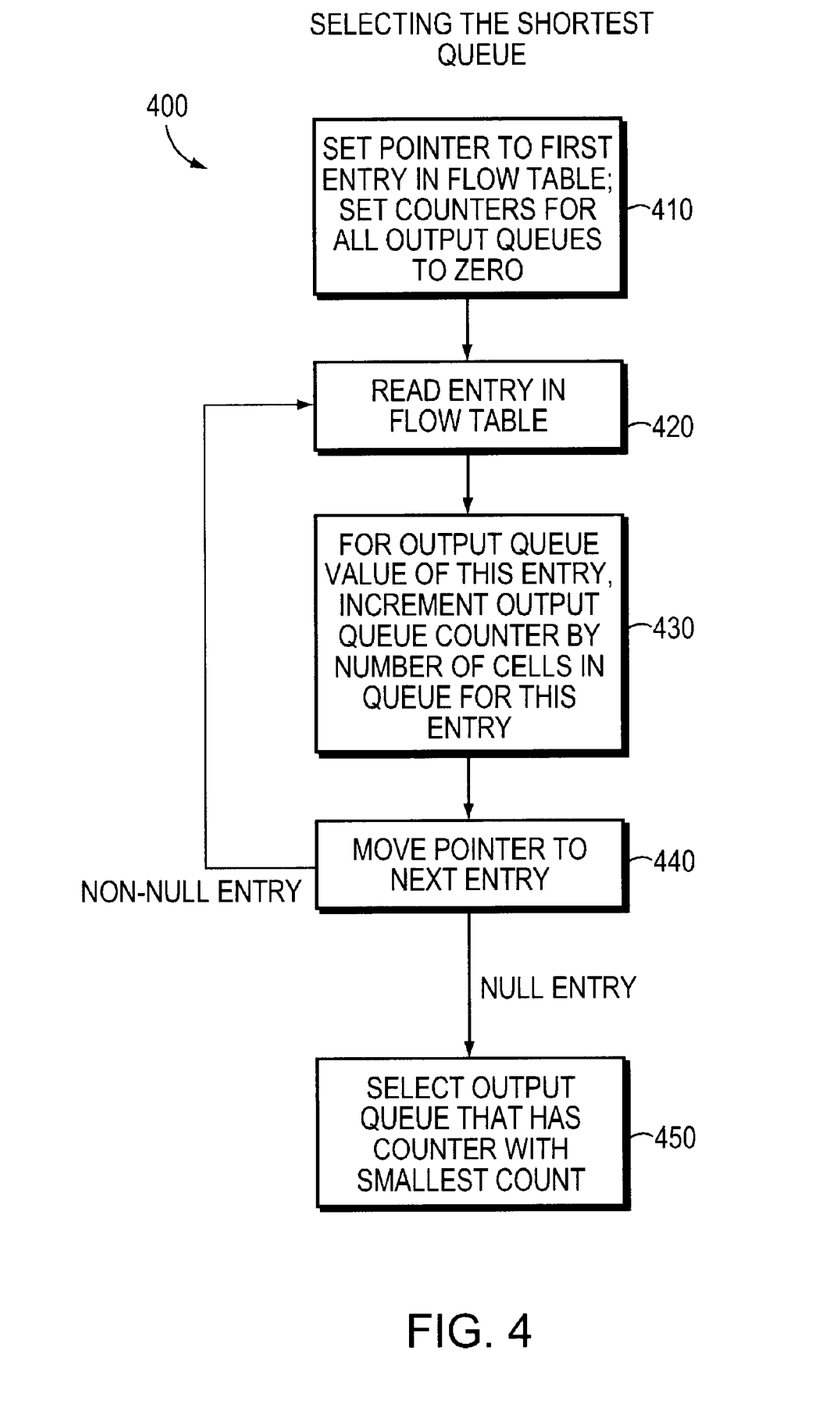
FIG. 4 is a process flow diagram for selecting the shortest queue.

If a matching entry for that destination vector is not found in the flow table, the cell is the first cell in a new flow as defined above. The MVOQ is selected by the allocation policy 320, preferably by the Shortest Queue First (SQF) policy 324. A process flow diagram 400 for determining the shortest queue is shown in FIG. 4. A pointer is initialized to point at the first entry in the table 410, and counters for counting output queue length for each output queue are set to be zero 410. The shortest queue is determined in the preferred embodiment by, for each entry in the flow table 420, 440, reading the output queue value and number of cells 420, incrementing the count for the output queue value read by the number of cells for this entry 430, and after all entries in the flow table have been read, choosing the MVOQ with the smallest count 450. A new entry in the flow table is created for this destination vector and this queue with the cell count for the entry equal to unity 326. However, other means for determining the shortest queue can be used, such as separately maintaining a total count for each output queue.

It is to be noted that for alternative embodiments where the communication is not cell-based, a measure of shortest queue other than number of cells can be used. One such measure is the total number of bytes in the queue.

Once the MVOQ is selected, in a preferred embodiment the cell is queued 330 by causing the tail element of the queue to point to the cell. The cell is set to have a null pointer in the node that is reserved to point to the next element. MVOQs are preferably maintained as linked lists with a node pointing to the next cell in the queue, with the last cell in the queue having a null pointer. There is a pointer to the head of each queue. A pointer to the tail of the queue is also maintained. In a preferred embodiment, these queues are implemented in hardware.

Sending a Cell

Figure 5:
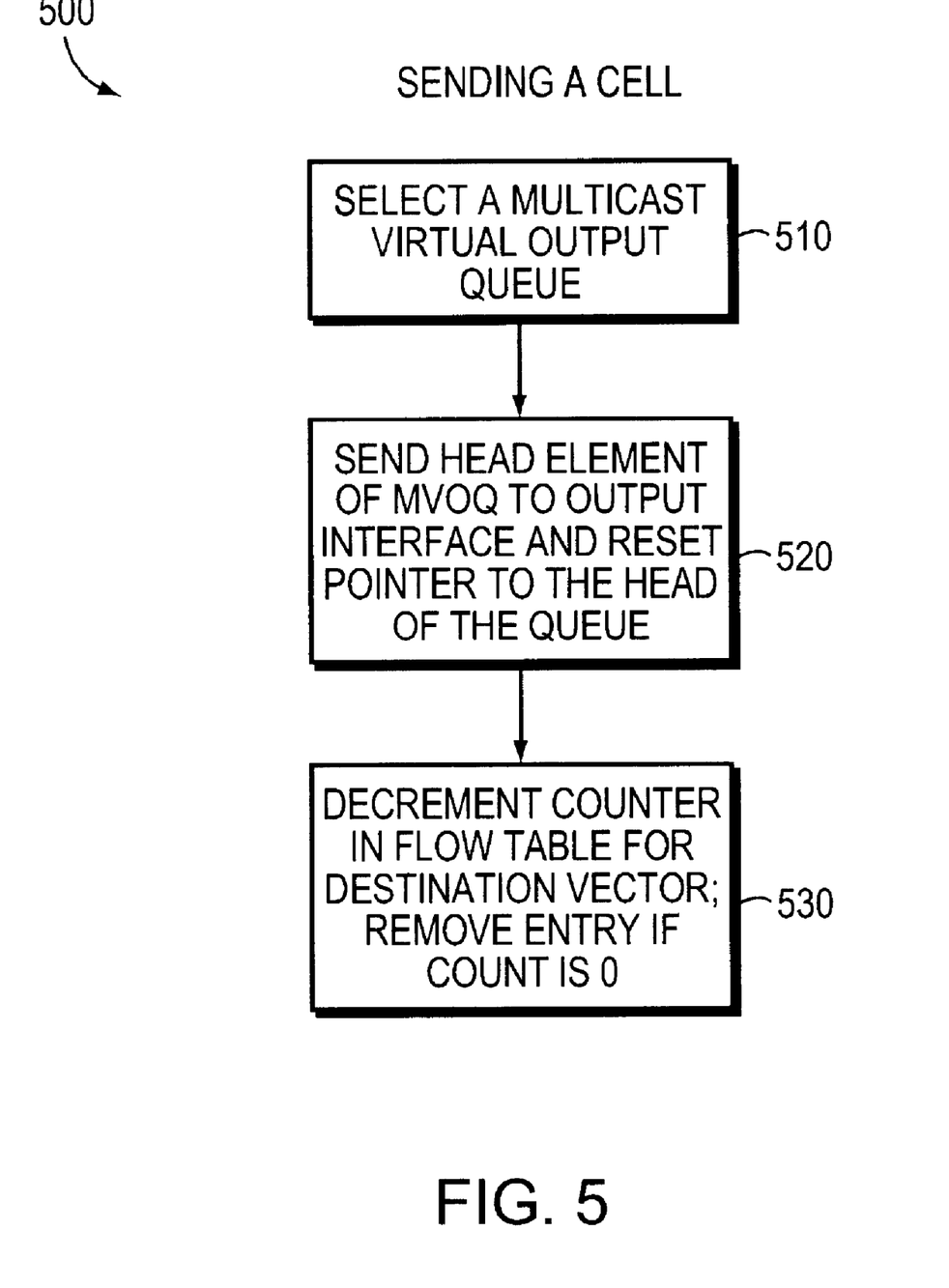
FIG. 5 is a process flow diagram for sending a cell.

FIG. 5 is a process flow diagram 500 for sending a cell. To send a cell, first an MVOQ is selected 510.

Next, the head element of the queue is sent to the output interface and the pointer to the head of the queue is set to point to the next cell in the queue 520. This can be done by fanout splitting method or without fanout splitting. Both methods are known in the art of switches. In non-fanout splitting, the cell is simultaneously sent to all outputs, and can only be sent if all output interfaces are available. If done by fanout splitting, where the cell is sent to a subset of its destination output interfaces available at the moment, the cell may be retained to later be sent to those output interfaces to which it has not yet been sent; this is known in the art of switches.

Whether fanout or non-fanout splitting is preferable depends on the situations, as is known in the art of switches. When switch fabric capacity is constrained relative to output queue resources, non-fanout splitting is preferable. When output queue capacity is more valuable than switch resources, fanout splitting is preferred.

In the preferred embodiment, non-fanout splitting is used. However, after reading this application, those of ordinary skill in the art will recognize that the invention can be implemented for fanout splitting without undue experimentation or new invention. One way is to maintain a separate list containing the "current" destination vector of the head element for each MVOQ, with the "current" destination vector being the destination to which the cell has yet to be sent.

When the cell has been successfully sent to all appropriate output interfaces, the counter for the destination vector is decremented 530. If the count for this destination vector becomes zero, the entry for this destination vector is removed from the flow table.

Global MVOQs

In the preferred embodiment, a set of MVOQs is associated with a single physical input interface. In an alternative embodiment of the invention, the use of MVOQs can be extended across all the input interfaces. The effect of such a scheme would be that any MVOQ for the switch is accessible to any incoming flow. If there are 2 physical input interfaces and each has 8 MVOQs, there is a total of 16 MVOQs available to any incoming flow. As a practical implementation matter, the MVOQs would still be associated with a physical input interface: if the shortest queue is an MVOQ associated with a first input interface, then an incoming message at a second input interface would be transferred to the first input interface for queuing in the MVOQ.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method of operating a switching device, said switching device receiving messages belonging to a plurality of multicast flows, comprising the steps of:

receiving, for each multicast flow of said plurality of multicast flows, a sequence of multicast messages;

associating each one message in each said sequence to a selected one of a set of multicast virtual output queues, said set of multicast virtual output queues having more than one and less than $2^N$ individual multicast virtual output queues for each one of a plurality of N output interfaces, and N is 2 or greater; and sending a head element of one of said set of multicast virtual output queues to said output interfaces.

2. A method as in claim 1, wherein said step of associating includes steps of selecting a shortest one of said set of multicast virtual output queues at a time of performance of said steps for receiving; and performing said steps of associating in response to a result of said steps of selecting.

3. A method as in claim 1, wherein said steps of associating include steps of selecting a shortest one of said set of multicast virtual output queues at a time of performance of said steps for receiving a first said message; and wherein said steps for associating operate to associate said first message with said shortest queue.

4. A method as in claim 1, wherein said steps of receiving include receiving a first said message;

said steps of associating include steps of (a) incrementing a counter for said selected queue; and (b) appending said first message to said selected queue; and said steps of sending include steps of (a) selecting one of said queues; (b) sending a head element from said selected queue to a set of output interfaces; and (c) decrementing said counter for said selected queue.

5. A method as in claim 1, wherein said steps of associating include steps of:

selecting a random one of said set of multicast virtual output queues at a time of performance of said steps of receiving; and performing said steps of associating in response to a result of said steps of selecting.

6. A method as in claim 1, wherein said steps of associating include steps of selecting one of said set of multicast virtual output queues at a time of performance of said steps of receiving wherein the step of selection uses a round robin technique; and performing said steps of associating in response to a result of said steps of selecting.

7. A method as in claim 1, wherein said steps of associating include steps of
selecting a random one of said set of multicast virtual output queues at a time of performance of said steps of receiving a first said message; and
wherein said steps of associating operate to associate said first message with said randomly selected queue.

8. A method as in claim 1, wherein said steps of associating include steps of
selecting a round-robin one of said set of multicast virtual output queues at a time of performance of said steps of receiving a first said message; and
wherein said steps of associating operate to associate said first message with said round robin queue.

9. A method of operating a switching device, said switching device receiving messages belonging to a plurality of multicast flows, comprising the steps of:
receiving, for each multicast flow of said plurality of multicast flows, a sequence of multicast messages;
associating each one message in each said sequence to a selected one of a set of multicast virtual output queues, said set of multicast virtual output queues having more than one and less than $2^N$ individual multicast virtual output queues for each one of a plurality of N output interfaces, and N is 2 or greater; and
sending a head element of one of said set of multicast virtual output queues to said output interfaces in accordance with a policy to reduce head-of-line blocking.

10. A method of operating a switching device, said switching device receiving messages belonging to a plurality of multicast flows, comprising the steps of:
receiving a multicast message of a flow;
determining if said flow is assigned to a multicast virtual output queue (MVOQ) and in the event it is not assigned to a MVOQ, selecting a multicast virtual output queue (MVOQ) for said flow, said MVOQ selected from a plurality of available MVOQs (the selected MVOQ), said selecting based upon a policy, where said policy is chosen to distribute multicast flows over said plurality of MVOQs to reduce head-of-line blocking;
receiving a second multicast message of said flow; and
assigning said second multicast message to said selected MVOQ.

11. The method of claim 10 further comprising:
implementing a number of said MVOQs where said number is greater than or equal to 1 and less than $2^N$, where N is a number of output ports of said switching device, and N is 2 or greater.

12. The method of claim 10, wherein said policy is a Shortest Queue First policy where said selected MVOQ is selected as an MVOQ with a count that is the smallest of all the MVOQs in the plurality of MVOQs.

13. The method of claim 12 wherein said count is a number of cells in the MVOQ.

14. The method of claim 12 wherein said count is a total count for the MVOQ.

15. The method of claim 12 wherein said count is a total number of bytes in the MVOQ.

16. The method of claim 10 wherein said policy is a random assignment policy where said selected MVOQ is selected by random assignment of said flow to an MVOQ from said plurality of MVOQs.

17. The method of claim 10 wherein said policy is a round robin policy where said selected MVOQ is selected in a sequential cyclical order from said plurality of MVOQs.

18. The method of claim 10 wherein said policy is a combination of allocation policies.

19. The method of claim 10 further comprising the step of:
creating an entry in a flow table, said entry associated with said flow wherein said flow table is used to assign multicast messages associated with said flow to said selected MVOQ.

20. A computer readable medium containing computer executable instructions for performing the method recited in claim 1, claim 5 or claim 10.

21. An electromagnetic signal propagating on a computer network, the electromagnetic signal carrying information for executing on a computer the method of claim 1, claim 5 or claim 10.

22. An apparatus for operating a switching device, said switching device receiving messages belonging to a plurality of multicast flows, comprising:
a circuit adapted to receive a multicast message of a flow;
a circuit adapted to implement a plurality of multicast virtual output queues (MVOQs);
a circuit adapted to determine if said flow is assigned to a multicast virtual output queue (MVOQ) and in the event that it is not assigned to a MVOQ select a multicast virtual output queue (MVOQ) from said plurality of MVOQs based upon a policy where said policy is chosen to distribute multicast flows over said plurality of MVOQs to reduce head-of-line blocking;
a circuit adapted to receive a second multicast message of said flow; and
a circuit adapted to assign said second multicast message to said selected MVOQ.

23. The apparatus of claim 22 further comprising:
a circuit adapted to implement a number of said MVOQs where said number is greater than or equal to 1 and less than $2^N$, where N is a number of output ports of said switching device, and N is 2 or greater.

24. The apparatus of claim 22, wherein said policy is a Shortest Queue First policy where said selected MVOQ is selected as an MVOQ with a count that is the smallest of all the MVOQs in the plurality of MVOQs.

25. The apparatus of claim 24 wherein said count is a number of cells in the MVOQ.

26. The apparatus of claim 24 wherein said count is a total count for the MVOQ.

27. The apparatus of claim 24 wherein said count is a total number of bytes in the MVOQ.

28. The apparatus of claim 22 wherein said policy is a random assignment policy where said selected MVOQ is selected by random assignment of said flow to an MVOQ from said plurality of MVOQs.

29. The apparatus of claim 22 wherein said policy is around robin policy where said selected MVOQ is selected in a sequential cyclical order from said plurality of MVOQs.

30. The apparatus of claim 22 wherein said policy is a combination of allocation policies.

31. The apparatus of claim 22 further comprising:
a circuit adapted to create an entry in a flow table wherein said entry is associated with said flow and said flow table is used to assign multicast messages associated with said flow to said selected MVOQ.

32. The apparatus of claim 31 wherein said flow table is implemented in a content addressable memory (CAM).

33. The apparatus of claim 22 wherein said circuit adapted to determine if said flow is assigned to a multicast virtual output queue is a processor operating under program control.

34. An apparatus for operating a switching device, said switching device receiving messages belonging to a plurality of multicast flows, comprising:

a circuit adapted to receive a multicast message of a flow;

means for determining if said flow is assigned to a multicast virtual output queue (MVOQ) and in the event that it is not assigned to an MVOQ, selecting a multicast virtual output queue (MVOQ) for said flow, said MVOQ selected from a plurality of available MVOQs (the selected MVOQ), said selecting based upon a policy, where said policy is chosen to distribute multicast flows over said plurality of MVOQs to reduce head-of-line blocking;

a circuit adapted to receive a second multicast message of said new multicast flow; and a circuit adapted to assign said second multicast message to said selected MVOQ.

35. The apparatus of claim 34 further comprising:

a circuit adapted to implement a number of said MVOQs where said number is greater than or equal to 1 and less than $2^N$, where N is a number of output ports of said switching device, and N is 2 or greater.

36. The apparatus of claim 34, wherein said policy is a Shortest Queue First policy where said selected MVOQ is selected as the MVOQ with a count that is the smallest of all the queues in the plurality of MVOQs.

37. The apparatus of claim 36 wherein said count is a number of cells in the MVOQ.

38. The apparatus of claim 36 wherein said count is a total count for the MVOQ.

39. The apparatus of claim 36 wherein said count is a total number of bytes in the MVOQ.

40. The apparatus of claim 34 wherein said policy is a random assignment policy where said selected MVOQ is selected at random from said plurality of MVOQs.

41. The apparatus of claim 34 wherein said policy is a round robin policy where said selected MVOQ is selected in a round robin fashion from said plurality of MVOQs.

42. The apparatus of claim 34 wherein said policy is a combination of allocation policies.

43. The apparatus of claim 34 further comprising:

a circuit adapted to create an entry in a flow table wherein said entry is associated with said flow and said flow table is used to assign multicast messages associated with said flow to said selected MVOQ.

44. The apparatus of claim 43 wherein said flow table is implemented in a content addressable memory (CAM).

45. The apparatus of claim 34 wherein said circuit adapted to determine if said flow is assigned to a multicast virtual output queue is a processor operating under program control.

* * * * *